Patented July 23, 1940

2,209,190

UNITED STATES PATENT OFFICE 2,209,190

MANUFACTURE OF HYDROCARBON PRODUCTS BY HYDROGENATION OF CARBON OXIDES

William E. Currie, Flushing, N. Y., assignor to Standard-I. G. Company

No Drawing. Application January 11, 1936, Serial No. 58,772

3 Claims. (Cl. 260—449)

This invention relates to improvements in the manufacture of valuable hydrocarbon products by the hydrogenation of carbon oxides. A particular object of the invention is to provide for better operation of the process by pressure control applied with respect to the reacting components so that their partial pressures may be held within the optimum range.

A further object of the invention is to control the progress of the reaction by regulating the addition or withdrawal of inert gas and/or reacting gases.

It is known from U. S. Patent 1,201,850, granted October 17, 1916, that oxygenated compounds and hydrocarbons can be obtained by reacting carbon oxides with hydrogen in the presence of catalysts at high temperature and pressure. Inert gases may be present in this process, as described in United States Patent 1,788,170, granted January 6, 1931. It is further known from the Fischer-Tropsch synthesis as described in U. S. Patent 1,746,464, granted February 11, 1930, that hydrocarbon products may be obtained by hydrogenating carbon oxides under lower pressure and temperature.

The present invention is distinguished from these prior processes by the fact that the synthesis of hydrocarbons from carbon oxides is conducted under higher pressure (in excess of 5 atmospheres absolute) while retaining the combined partial pressure of the reacting components at a value less than 5 atmospheres. In this way the tendency to form oxygen-containing compounds, encountered at high pressure with relatively undiluted gases, is avoided. At the same time the catalyst is protected by the inert gases from the adverse effect of excessive heat which may develop when relatively undiluted gases are used. The inert gases, either present initially or introduced in the course of the reaction, disperse the heat of reaction. The yield per pass of hydrocarbon products for each volume of gas treated is naturally less by the present method, due to the presence of a diluent, but the unreacted components are recycled so as to secure ultimately the same or a better conversion than with the undiluted gases.

It is preferred to utilize a water gas mixture of the approximate composition 50% carbon monoxide and 50% hydrogen and to dilute this with nitrogen or other inert gas such as methane or ethane. If the reaction is to be conducted at 10 atmospheres absolute pressure then the volume of diluent should be somewhat more than the combined volume of the reactants. If a total pressure of 20 atmospheres is used the volume of diluent should be at least three times the combined volume of the reactants. Under the above conditions the partial pressure of the reactants will be below 5 atmospheres in each case and the products will be hydrocarbon in character.

More specifically, one part of the carbon monoxide-hydrogen mixture may be used for each 1½ to 4 parts of the inert diluent. The catalyst may be any of those described in Patent No. 1,746,464, or other catalysts which are available for the synthesis of hydrocarbons from carbon oxides. The temperature is advantageously somewhat higher than described in Patent 1,746,464 and ranges between about 380° to 450° C. The higher temperature expedites the reaction but lower temperatures may be used.

The gas mixture is passed through or over the catalyst at a rate of 10–20 litres per hour and provision is preferably made for introducing additional streams of inert gas and/or reacting gases, or for withdrawing one or more of these, in order to control the reaction.

The process is preferably run to produce hydrocarbons lying mostly in the gasoline range and adapted for motor fuel, as such or after blending with benzol, polymer gasoline, cracked gasoline, or other suitable blending material.

Benzol may be produced as an incident of the process by adjusting the conditions (especially by elevating the temperature) to produce substantial quantities of methane, as well as higher hydrocarbons, and treating the methane with an electrical spark discharge in known manner to produce acetylene which is then polymerized to benzol by means of an iron-nickel-silica gel catalyst at about 250–260° C. An alternative known process for this purpose is the pyrolysis of methane at 1000–1300° C. without substantial pressure and in the absence of catalysts, to form finely divided carbon, light liquid hydrocarbons (mostly benzol with small quantities of naphthenes) and hydrogen.

Various other pressures and temperatures might be used but in all cases the partial pressure of the carbon monoxid and hydrogen together should be below 5 atmospheres.

I claim:

1. Process of making hydrocarbons from carbon oxides by hydrogenation comprising subjecting a mixture of an oxide of carbon and hydrogen to the action of a Fischer-Tropsch catalyst at temperatures between about 380 and 450° C. and at a total pressure between 10 and 20 atmospheres but in the presence of a sufficient volume of a diluting gas to insure a partial pressure of the combined reactants below 5 atmospheres.

2. The process of making hydrocarbons from carbon oxides by hydrogenation under pressures between 10 and 20 atmospheres and at a temperature between about 380 and 450° C. in the presence of a Fischer-Tropsch catalyst, comprising diluting the reacting gases with 1½ to 4 volumes of inert gas per volume of reacting gases so that the combined partial pressure of carbon monoxide and hydrogen is less than 5 atmospheres.

3. Process according to claim 1 in which the relative volumes of the individual gases present during the reaction are varied to control the reaction.

WILLIAM E. CURRIE.